United States Patent
Goldschmidt et al.

(10) Patent No.: US 8,621,154 B1
(45) Date of Patent: Dec. 31, 2013

(54) FLOW BASED REPLY CACHE

(75) Inventors: Jason L. Goldschmidt, Brookline, MA (US); Peter D. Shah, Waltham, MA (US); Thomas M. Talpey, Stow, MA (US)

(73) Assignee: NetApp, Inc., Sunnyvale, CA (US)

( * ) Notice: Subject to any disclaimer, the term of this patent is extended or adjusted under 35 U.S.C. 154(b) by 1363 days.

(21) Appl. No.: 12/105,914

(22) Filed: Apr. 18, 2008

(51) Int. Cl.
  G06F 12/00 (2006.01)
  G06F 13/00 (2006.01)
  G06F 13/28 (2006.01)
  G06F 17/30 (2006.01)

(52) U.S. Cl.
  USPC ............ 711/129; 711/130; 711/154; 707/827

(58) Field of Classification Search
  USPC ................... 711/118, 129–130, 154; 707/827
  See application file for complete search history.

(56) References Cited

U.S. PATENT DOCUMENTS

| | | | |
|---|---|---|---|
| 3,771,137 A | 11/1973 | Barner et al. |
| 4,075,686 A | 2/1978 | Calle et al. |
| 4,156,907 A | 5/1979 | Rawlings et al. |
| 4,268,907 A | 5/1981 | Porter et al. |
| 4,399,503 A | 8/1983 | Hawley |
| 4,476,526 A | 10/1984 | Dodd |
| 4,500,954 A | 2/1985 | Duke et al. |
| 4,504,902 A | 3/1985 | Gallaher et al. |
| 4,598,357 A | 7/1986 | Swenson et al. |
| 4,669,043 A | 5/1987 | Kaplinsky |
| 4,688,221 A | 8/1987 | Nakamura et al. |
| 4,698,808 A | 10/1987 | Ishii |
| 4,723,223 A | 2/1988 | Hanada |
| 4,761,785 A | 8/1988 | Clark et al. |
| 4,779,189 A | 10/1988 | Legvold et al. |
| 4,800,489 A | 1/1989 | Moyer et al. |
| 4,805,090 A | 2/1989 | Coogan |
| 4,831,520 A | 5/1989 | Rubinfeld et al. |
| 4,837,675 A | 6/1989 | Bean et al. |
| 4,864,497 A | 9/1989 | Lowry et al. |
| 4,868,734 A | 9/1989 | Idleman et al. |
| 4,888,691 A | 12/1989 | George et al. |
| 4,896,259 A | 1/1990 | Jacobs et al. |
| 4,899,342 A | 2/1990 | Potter et al. |

(Continued)

OTHER PUBLICATIONS

Gait, Jason, Phoenix: A Safe In-Memory File System. Communications of the ACM, 33(1): pp. 81-86, Jan. 1990.

(Continued)

*Primary Examiner* — Ryan Bertram
(74) *Attorney, Agent, or Firm* — Cesari and McKenna, LLP

(57) ABSTRACT

A flow based reply cache of a storage system is illustratively organized into one or more microcaches, each having a plurality of reply cache entries. Each microcache is maintained by a protocol server executing on the storage system and is allocated on a per client basis. To that end, each client is identified by a client connection or logical "data flow" and is allocated its own microcache and associated entries, as needed. As a result, each microcache of the reply cache may be used to identify a logical stream of client requests associated with a data flow, as well as to isolate that client stream from other client streams and associated data flows used to deliver other requests served by the system. The use of microcaches thus provides a level of granularity that enables each client to have its own pool of reply cache entries that is not shared with other clients, thereby obviating starvation of entries allocated to the client in the reply cache.

28 Claims, 5 Drawing Sheets

(56) References Cited

U.S. PATENT DOCUMENTS

| | | | |
|---|---|---|---|
| 4,905,141 | A | 2/1990 | Brenza |
| 4,972,316 | A | 11/1990 | Dixon et al. |
| 4,989,206 | A | 1/1991 | Dunphy, Jr. et al. |
| 5,016,165 | A | 5/1991 | Tanikawa et al. |
| 5,119,485 | A | 6/1992 | Ledbetter, Jr. et al. |
| 5,124,987 | A | 6/1992 | Milligan et al. |
| RE34,100 | E | 10/1992 | Hartness |
| 5,155,835 | A | 10/1992 | Belsan |
| 5,175,825 | A | 12/1992 | Starr |
| 5,179,702 | A | 1/1993 | Spix et al. |
| 5,185,694 | A | 2/1993 | Edenfield et al. |
| 5,206,939 | A | 4/1993 | Yanai et al. |
| 5,276,823 | A | 1/1994 | Cutts, Jr. et al. |
| 5,283,884 | A | 2/1994 | Menon et al. |
| 5,297,258 | A | 3/1994 | Hale et al. |
| 5,313,612 | A | 5/1994 | Satoh et al. |
| 5,333,294 | A | 7/1994 | Schnell |
| 5,355,453 | A | 10/1994 | Row et al. |
| 5,388,242 | A | 2/1995 | Jewett |
| 5,388,243 | A | 2/1995 | Glider et al. |
| 5,426,747 | A | 6/1995 | Weinreb et al. |
| 5,513,314 | A * | 4/1996 | Kandasamy et al. ........ 714/6.31 |
| 5,524,205 | A | 6/1996 | Lomet et al. |
| 5,581,724 | A | 12/1996 | Belsan et al. |
| 5,778,431 | A | 7/1998 | Rahman et al. |
| 5,907,848 | A | 5/1999 | Zaiken et al. |
| 6,014,674 | A | 1/2000 | McCargar |
| 6,078,999 | A | 6/2000 | Raju et al. |
| 6,266,785 | B1 | 7/2001 | McDowell |
| 6,442,508 | B1 | 8/2002 | Liao et al. |
| 6,636,879 | B1 | 10/2003 | Doucette et al. |
| 6,671,773 | B2 | 12/2003 | Kazar et al. |
| 6,732,293 | B1 | 5/2004 | Schneider |
| 6,856,993 | B1 | 2/2005 | Verma et al. |
| 7,062,675 | B1 | 6/2006 | Kemeny et al. |
| 7,093,072 | B2 | 8/2006 | Haskins |
| 7,234,076 | B2 | 6/2007 | Daynes et al. |
| 2003/0088814 | A1 | 5/2003 | Campbell et al. |
| 2004/0205295 | A1* | 10/2004 | O'Connor et al. ............ 711/129 |
| 2005/0055511 | A1* | 3/2005 | Schreter ........................ 711/134 |
| 2008/0126547 | A1* | 5/2008 | Waldspurger ................. 709/226 |

OTHER PUBLICATIONS

Kazar, Michael L., et al., Decorum File System Architectural Overview, USENIX Summer Conference, Anaheim, California, 1990, 13 pages.

Lorie, Raymond, A, Physical Integrity in a large segmented database, ACM Trans. Database Systems, 2(1): 91-104, Mar. 1977.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Ousterhout, John K. et al., The Sprite Network Operating System, Computer Science Division, Department of Electrical Engineering and Computer Sciences, Univ. of CA, Berkley, Nov. 19, 1987, 32 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Ousterhout, John, Why Aren't Operating Systems Getting Faster as Fast as Hardware?, Digital WRL Technical Note TN-11, Oct. 1989, 20 pages.

Ousterhout, John, A Brief Retrospective on The Sprite Network Operating System, found at http://www.cs.berkeley.edu/projects/sprite/retrospective.html.visited on Mar. 11, 2005, 5 pages.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

Patterson, D., et al., A Case for Redundant Arrays of Inexpensive Disks (RAID), SIGMOND International Conference on Management of Data, Chicago, IL, USA, Jun. 1-3, 1988, SIGMOND Record (17):3:109-16 (Sep. 1988).

Peterson, Zachary Nathaniel Joseph, Data Placement for Copy-on-Write Using Virtual Contiguity, University of CA, Santa Cruz, Master of Science in Computer Science Thesis, Sep. 2002.

Quinlan, Sean, A Cached WORM File System, Software-Practice and Experience, 21(12):1289-1299 (1991).

Rosenberg, J., et al., Stability in a Persistant Store Based on a Large Virtual Memory, in Security and Persistence, Rosenber, J. & Keedy, J.L. (ed), Springer-Verlag (1990) pp. 229-245.

Rosenblum, Mendel, et al., The LFS Storage Manager, Computer Science Division, Electrical Engin. And Computer Sciences, Univ. of CA, presented at Summer '90 USENIX Technical Conference, Anaheim, CA Jun. 1990, 16 pages.

Rosenblum, Mendel, et al. The Design and Implementation of a Log-Structured File System Jul. 24, 1991 pp. 1-15.

Sandberg, Russel et al., Design and implementation of the Sun Network Filesystem. In Proc. Summer 1985 USENIX Conf., pp. 119-130, Portland or (USA), Jun. 1985.

Satyanarayanan, M., et al., The ITC Distributed File System: Principles and Design, In Proceedings of the 10th ACM Symposium on Operating Systems Principles, (19)5:56-67, Dec. 1985.

Satyanarayanan, M., A survey of distributed file-systems. Annual Review of Computing Science, 4(73-104), 1989.

Satyanarayanan, M., et al., Coda: A highly available file system for a distributed workstation environment. IEEE Transactions on Computers, 39(4):447-459, 1990.

Satyanarayanan, M., Scalable, Secure, and Highly Available Distributed File Access, Computer May 1990: 9-21.

Sidebotham, Bob, Volumes: The Andrew File System Data Structuring Primitive, EEUG Conference Proceedings, Manchester, UK, Autumn 1986.

Tanenbaum, Andrew S., "The Internet Transport Protocols (TCP and UDP)", Section 6.4: The Transport Layer, Computer Networks Third Edition, Mar. 1996, Prentice-Hall, Inc., Upper Saddle River, New Jersey, pp. 521-542.

Juszczak, Chet, "Improving the Performance and Correctness of an NFS Server", Winter 1989 USENIX Conference Proceedings, USENIX Association, Feb. 1989, Berkeley, CA, 11 pages.

U.S. Appl. No. 12/148,930, entitled Persistent Reply Cache Integrated With File System, by David B. Noveck et al., filed Apr. 23, 2008, 46 pages.

Shepler, S., et al., "NFS Version 4 Minor Version 1 (draft-ietf-nfsv4-minorversion1-21.txt)", Internet-Draft, http://www.nfsv4-editor.org/draft-21/draft-ieff-nfsv4-minorversion1-21-1n.txt, The IETF Trust, Feb. 25, 2008, 536 pages.

* cited by examiner

FLOW BASED REPLY CACHE

FIELD OF THE INVENTION

The present invention relates to storage systems and, more specifically, to a reply cache used in a storage system.

BACKGROUND OF THE INVENTION

A storage system is a computer that provides storage services relating to the organization of information on writeable persistent storage devices, such as non-volatile memories and/or disks. The storage system typically includes a storage operating system that implements a file system to logically organize the information as a hierarchical structure of data containers, such as files and directories on, e.g., the disks. Each "on-disk" file may be implemented as set of data structures, e.g., disk blocks, configured to store information, such as the actual data for the file. A directory, on the other hand, may be realized as a specially formatted file in which information about other files and directories are stored.

The storage system may be further configured to operate according to a client/server model of information delivery to thereby allow many clients to access files and directories stored on the system. In this model, the client may comprise an application executing on a computer that "connects" (i.e., via a client connection) to the storage system over a computer network, such as a point-to-point link, shared local area network, wide area network or virtual private network implemented over a public network, such as the Internet. Each client may request the services of the storage system by issuing file system protocol messages or requests, such as the conventional Network File System (NFS) protocol requests, to the system over the client connection identifying one or more files to be accessed. In response, the file system executing on the storage system services the request and returns a reply to the client.

Broadly stated, the client connection is provided by a process of a transport layer, such as the Transmission Control Protocol (TCP) layer, of a protocol stack residing in the client and storage system. The TCP layer processes establish the client (TCP) connection in accordance with a conventional "3-way handshake" arrangement involving the exchange of TCP message or segment data structures. The resulting TCP connection is a reliable, securable logical circuit that is generally identified by port numbers and Internet Protocol (IP) addresses of the client and storage system. The TCP protocol and establishment of a TCP connection are well-known and described in *Computer Networks, 3rd Edition*, particularly at pgs. 521-542.

Many versions of the NFS protocol utilize reply caches for their operation. A reply cache may serve many purposes, one of which is to prevent re-execution (replay) of non-idempotent operations by identifying duplicate requests. By caching reply information for such operations, replies to duplicate requests may be rendered from cached information, as opposed to re-executing the operation with the file system. For example, assume a client issues an NFS request to the storage system, wherein the request contains a non-idempotent operation, such as a rename operation that renames, e.g., file A to file B. Assume further that the file system receives and processes the request, but the reply to the request is lost or the connection to the client is broken. A reply is thus not returned to the client and, as a result, the client resends the request. The file system then attempts to process the rename request again but, since file A has already been renamed to file B, the system returns a failure, e.g., an error reply, to the client (even though the operation renaming file A to file B had been successfully completed). A reply cache attempts to prevent such failures by recording the fact that the particular request was successfully executed, so that if it were to be reissued for any reason, the same reply will be resent to the client (instead of re-executing the previously executed request, which could result in an inappropriate error reply).

Another purpose of the reply cache is to provide a performance improvement through work-avoidance by tracking "in-progress" requests. When using an unreliable transport protocol, such as the User Datagram Protocol (UDP), the client typically retransmits a subsequent NFS request if a response is not received from the storage system upon exceeding a threshold (e.g., one second) after transmission of an initial NFS request. For an NFS request containing an idempotent operation having a large reply, such as read or readdir operation, the actual processing of the request by the file system could exceed this threshold for retransmission. Such in-progress requests are tracked so that any duplicate requests received by the system are discarded ("dropped") instead of processing duplicate file operations contained in the requests. This work-avoidance technique provides a noticeable performance improvement for the NFS protocol over the UDP protocol.

A known implementation of an NFS reply cache is described in a paper titled *Improving the Performance and Correctness of an NFS Server*, by Chet Juszczak, Winter 1989 USENIX Conference Proceedings, USENIX Association, Berkeley, Calif., February 1989, pgs 53-63. Broadly stated, this implementation places reply cache entries into a "global least recently used (LRU)" data structure, i.e., a list ordered by a last modified time for each entry. In response to processing of a new NFS request from a client, a protocol server, e.g., an NFS server, executing on the storage system removes the oldest (thus, least recently used) entry from the list, clears its reply data and assigns the entry to the new request (thus invalidating the old cache entry). The reply cache implementation accords equal weight to all cached NFS replies and cache management is predicated on maintaining a complete record of the most recent replies in the reply cache using an LRU algorithm.

In general, clients utilizing the NFS protocol over the TCP protocol can retransmit NFS requests (if responses are not received from the storage system) a substantially long period of time after transmission of their initial requests. Such long retransmit times often result in active clients "starving" slower/retransmitting clients of entries in the reply cache, such that it is unlikely that a retransmitted duplicate non-idempotent request (in a deployment using NFS over TCP) will be found in a global LRU reply cache. The ensuing cache miss results in a replay of the non-idempotent operation and, potentially, data corruption.

SUMMARY OF THE INVENTION

The present invention overcomes the disadvantages of the prior art by providing a flow based reply cache of a storage system. The flow based reply cache is illustratively organized into one or more microcaches, each having a plurality of reply cache entries. Each microcache is maintained by a protocol server executing on the storage system and is allocated on a per client basis. To that end, each client is identified by a client connection or logical "data flow" and is allocated its own microcache and associated entries, as needed. As a result, each microcache of the reply cache may be used to identify a logical stream of client requests associated with a data flow, as well as to isolate that client stream from other client streams and associated data flows used to deliver other requests served by the system. The use of microcaches thus provides a level of granularity that enables each client to have its own pool of reply cache entries that is not shared with other clients, thereby obviating starvation of entries allocated to the client in the reply cache.

In an illustrative embodiment, each client creates a client connection (e.g., a TCP connection) with a protocol server (e.g., an NFS server) executing on the storage system to issue requests (e.g., NFS requests) of a logical stream to the server. In response to creating the connection or data flow associated with the client, the NFS server allocates a microcache to the data flow. The microcache is illustratively embodied as a "bin" having allocated entries or "buckets" into which are loaded replies associated with the requests of the stream issued by the client. The depth of the microcache illustratively comprises an estimated number of allocated entries that is managed using a predetermined policy.

The flow based reply cache illustratively includes a data structure, e.g., a flow look-up table, having a plurality of entries, each of which contains a reference (e.g., a logical data flow) to a microcache. Each logical data flow is represented by a flow data structure comprising two parts: (i) an identifier component used by the NFS server to identify a particular logical data flow, and (ii) a main body component containing the actual reply cache information and statistics for the data flow. At the core of each main body component is a microcache look-up table used to either locate free, available entries for the microcache within a least recently used list or identify in progress entries within an in-progress request list allocated to each data flow.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF ILLUSTRATIVE EMBODIMENTS

The present invention is directed to a flow based reply cache having an architecture that provides an improvement to the problematic global LRU reply cache implementation of the prior art. Instead of using a global LRU implementation, cache entries are stored on a per-client connection basis. Note that, as used herein, the term "client connection" denotes either a TCP connection, UDP packets grouped into the same logical network data flow or any other identifier, derived from underlying protocols, used to differentiate data sent from a client. A protocol server (e.g., a NFS server) executing on a storage system maintains a microcache for each client connection (or logical data flow) to store and retrieve recent replies for requests (e.g., NFS requests) issued by a client.

Each microcache is dynamically managed and tuned for each data flow. By maintaining a microcache area for each client connection in a non-global manner, the NFS server can prevent an aggressive client from starving a comparatively inactive client of reply cache resources. The architecture of the flow based reply cache also allows the server to keep statistics for each client and use that information to tailor each cache to the needs of a client.

Figure 1:
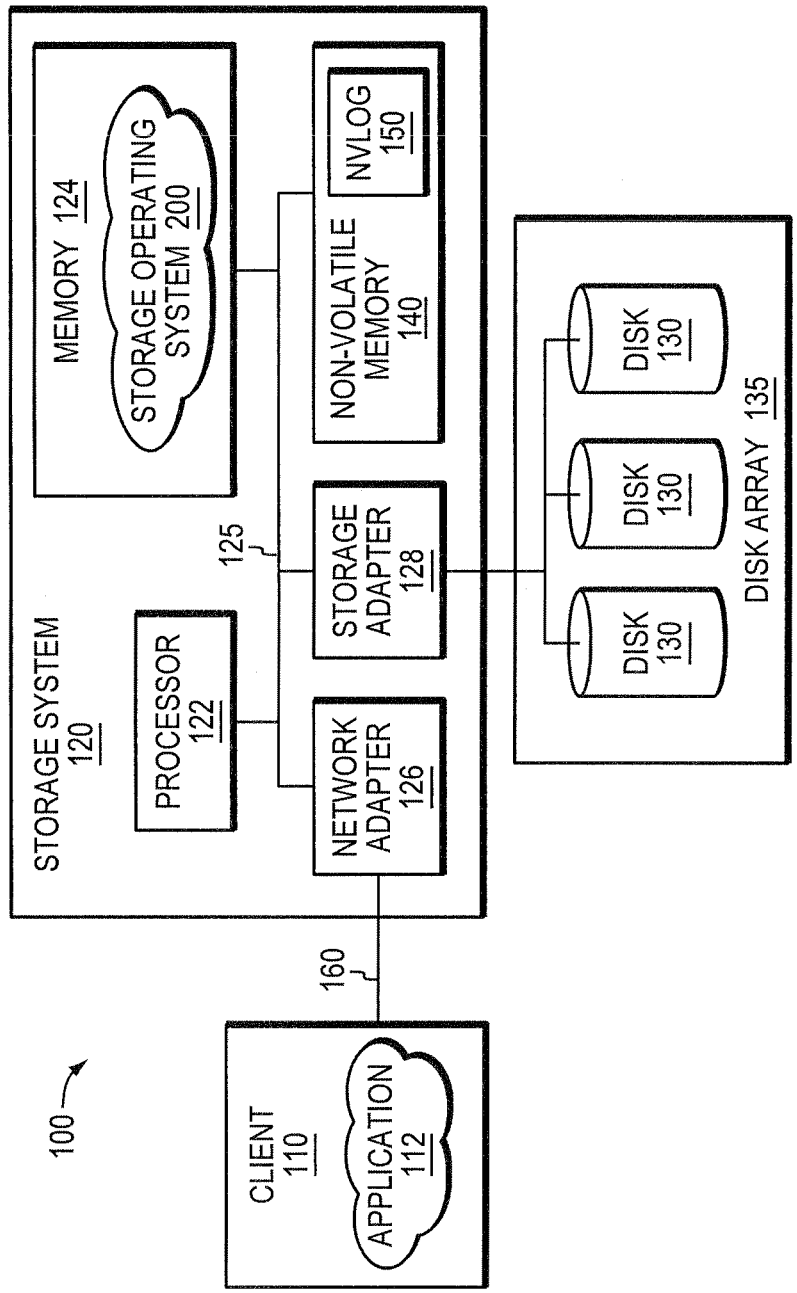
FIG. 1 is a schematic block diagram of an environment including a storage system that may be advantageously used with the present invention.

FIG. 1 is a schematic block diagram of an environment 100 including a storage system that may be advantageously used with the present invention. The storage system 120 is a computer that provides storage services relating to the organization of information on writable persistent storage devices, such as disks 130 of disk array 135. To that end, the storage system 120 comprises a processor 122, a memory 124, a network adapter 126, a storage adapter 128 and non-volatile memory 140 interconnected by a system bus 125. The storage system 120 also includes a storage operating system 200 that implements a virtualization system to logically organize the information as a hierarchical structure of data containers, such as files, directories and logical units, on the disks 130.

The memory 124 comprises storage locations that are addressable by the processor and adapters for storing software programs and data structures associated with the embodiments described herein. The processor and adapters may, in turn, comprise processing elements and/or logic circuitry configured to execute the software programs and manipulate the data structures. The storage operating system 200, portions of which are typically resident in memory and executed by the processing elements, functionally organizes the storage system by, inter alia, invoking storage operations in support of software processes executing on the system. It will be apparent to those skilled in the art that other processing and memory means, including various computer readable media, may be used to store and execute program instructions pertaining to the inventive technique described herein.

The non-volatile memory 140 comprises electronic storage illustratively embodied as a solid-state, non-volatile random access memory (NVRAM) array having either a back-up battery or other built-in last-state-retention capabilities (e.g., non-volatile semiconductor memory) that hold the last state of the memory in the event of any power loss to the array. As described herein, a portion of the non-volatile memory 140 is organized as temporary, yet persistent, non-volatile log storage (NVLOG 150) capable of maintaining information in light of a failure to the storage system.

The network adapter 126 comprises the mechanical, electrical and signaling circuitry needed to connect the storage system 120 to a client 110 over a computer network 160, which may comprise a point-to-point connection or a shared medium, such as a local area network. The client 110 may be a general-purpose computer configured to execute applications 112, such as a database application. Moreover, the client 110 may interact with the storage system 120 in accordance with a client/server model of information delivery. That is, the client may request the services of the storage system, and the system may return the results of the services requested by the client, by exchanging packets over the network 160. The clients may issue packets including file-based access protocols, such as the Common Internet File System (CIFS) protocol or NFS protocol, over TCP/IP when accessing information in the form of files. Alternatively, the client may issue packets including block-based access protocols, such as the Small Computer Systems Interface (SCSI) protocol encapsulated over TCP (iSCSI) and SCSI encapsulated over FC (FCP), when accessing information in the form of blocks.

The storage adapter 128 cooperates with the storage operating system 200 executing on the storage system to access information requested by the client. The information may be stored on the disks 130 of the disk array 135 or other similar media adapted to store information. The storage adapter includes input/output (I/O) interface circuitry that couples to the disks 130 over an I/O interconnect arrangement, such as a conventional high-performance, Fibre Channel serial link topology. The information is retrieved by the storage adapter and, if necessary, processed by the processor 122 (or the adapter 128) prior to being forwarded over the system bus 125 to the network adapter 126, where the information is formatted into a packet and returned to the client 110.

The disks 130 of the array are illustratively organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations, as well as other forms of redundancy, may be used in accordance with the inventive principles described herein.

Figure 2:
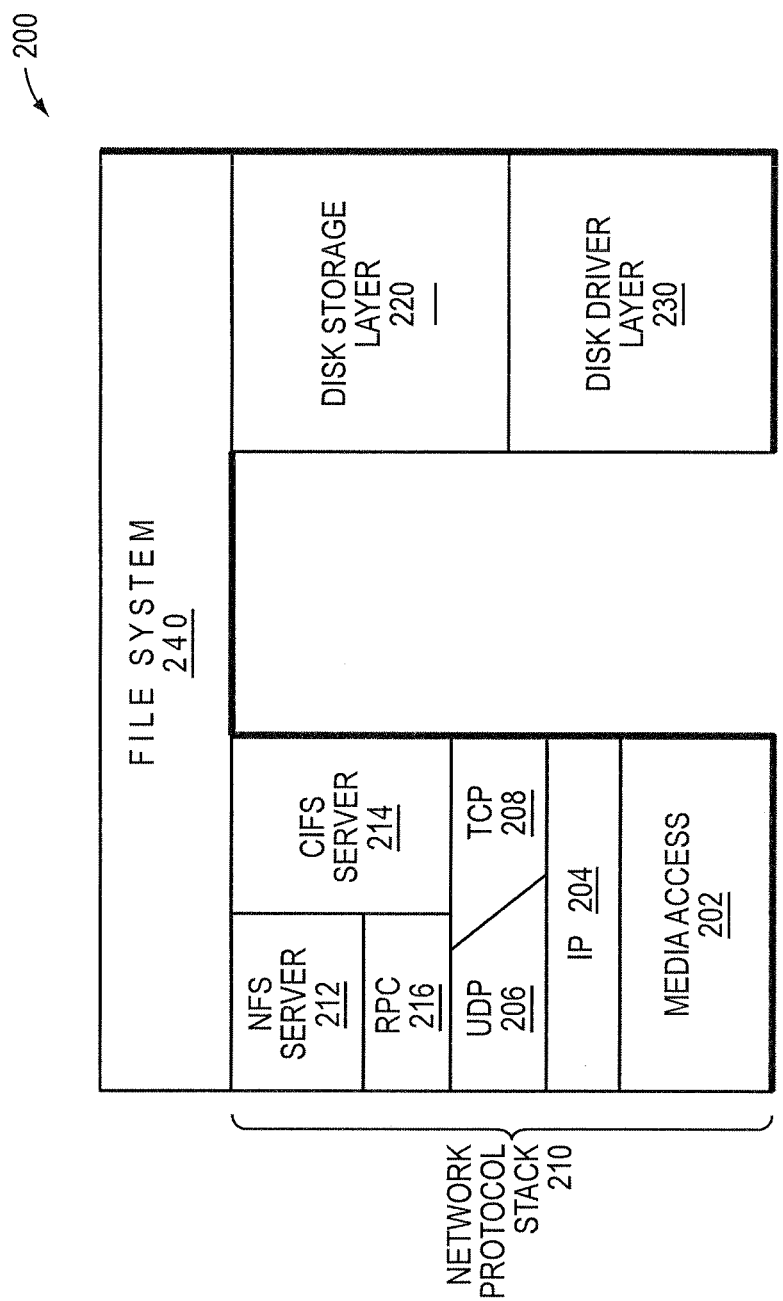
FIG. 2 is a schematic block diagram of a storage operating system that may be advantageously used with the present invention.

FIG. 2 is a schematic block diagram of the storage operating system 200 that may be advantageously used with the present invention. In an illustrative embodiment described herein, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to the file system component of any storage operating system that is otherwise adaptable to the teachings of this invention.

The storage operating system comprises a series of software layers, including a network driver layer (e.g., a media access layer 202, such as an Ethernet driver), network protocol layers (e.g., the IP layer 204 and its supporting transport mechanisms, the UDP layer 206 and the TCP layer 208), as well as a protocol server layer (e.g., a NFS server 212, a CIFS server 214, etc.) and a presentation layer configured to provide bindings for the transport mechanisms (e.g., a RPC layer 216) organized as a network protocol stack 210. In addition, the storage operating system 200 includes a disk storage layer 220 that implements a disk storage protocol, such as a RAID protocol, and a disk driver layer 230 that implements a disk access protocol such as, e.g., a SCSI protocol.

Bridging the disk software layers with the network and protocol server layers is a virtualization system that may be abstracted through the use of a database management system, a volume manager or, as described herein, a file system 240. The file system 240 illustratively provides logical volume management capabilities for use in access to the information stored on the storage devices, such as non-volatile memory 140 and disks 130. That is, in addition to providing file system semantics, the file system 240 provides functions normally associated with a volume manager. These functions include (i) aggregation of the disks, (ii) aggregation of storage bandwidth of the disks, and (iii) reliability guarantees, such as mirroring and/or parity (RAID).

The file system 240 illustratively implements the WAFL file system having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Operationally, a request from the client 110 is forwarded as one or more packets over the computer network 160 and onto the storage system 120 where it is received at the network adapter 126. A network driver of the protocol stack 210 processes the packet and, if appropriate, passes it on to a network protocol and protocol server layer for additional processing prior to forwarding to the file system 240. Here, the file system generates operations to load (retrieve) the requested data from disk if it is not resident "in core", i.e., in the memory 124. If the information is not in the memory, the file system 240 indexes into the inode file using the inode number to access an appropriate entry and retrieve a logical volume block number (vbn). The file system then passes a message structure including the logical vbn to the disk storage layer 220; the logical vbn is mapped to a disk identifier and physical block number (disk,pbn) and sent to an appropriate driver (e.g., SCSI) of the disk driver layer 230. The disk driver accesses the pbn from the specified disk and loads the requested data block(s) in the memory 124 for processing by the storage system. Upon completion of the request, the storage system (and operating system) returns a reply to the client 110 over the network 160.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a storage system 120, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Flow Based Reply Cache

As noted, the present invention is directed to a flow based reply cache of a storage system. The flow based reply cache is illustratively organized into one or more microcaches, each having a plurality of reply cache entries. Each microcache is maintained by a protocol server executing on the storage system and is allocated on a per client basis. To that end, each client is identified by its client connection or logical "data flow" (e.g., client (source) and storage system (destination) connection identifiers) and is allocated its own microcache and associated entries, as needed. As used herein, a connection identifier refers to a token which uniquely identifies a client's logical request stream. The token is derived from information describing the client's association with the server. This information includes, but is not limited to, explicit identifiers and/or transport identifiers, such as network (IP) addresses, network ports and transport protocols. As a result, each microcache of the reply cache may be used to identify a logical stream of client requests associated with a data flow, as well as to isolate that client stream from other client streams and associated data flows used to deliver other requests served by the system. The use of microcaches thus provides a level of granularity that enables each client to have its own pool of reply cache entries that is not shared with other clients, thereby obviating starvation of entries allocated to the client in the reply cache.

The flow based reply cache is illustratively implemented in memory 124 and has an in-core structure configured for use by the protocol server when cooperating with the file system 240. The file system, in turn, operates in an integrated manner with the use of non-volatile memory 140, a portion of which is organized as the NVLOG 150. Many requests executed (processed) by the file system 240 are recorded in the NVLOG, with each request being considered complete once the NVLOG record is marked complete. Execution of these requests generally requires some type of state change and, as such, the requests are considered non-idempotent requests including, e.g., rename requests.

As an example, assume the file system executes a client request (forwarded by the protocol server of the network protocol stack 210) to rename a file from A to B. Broadly stated, the file system 240 executes (processes) the request by, e.g., retrieving appropriate blocks of a directory from disk 130, loading the blocks into the memory 124 and changing (modifying) the blocks, including an appropriate block (entry) of the directory to reflect renaming of the file to B. The file system then marks the modified memory (e.g., buffer cache) blocks, including the directory entry block that now contains the name B for the file, as "dirty" so that they may be written to disk. At this point, the file system 240 does not write the dirty blocks to disk, but instead waits until execution of a consistency model event, e.g., a consistency point (CP), of the system.

Meanwhile, the file system creates a file system operation record of the request and stores the record in the NVLOG 150. Subsequently during the CP, the contents of the record are not written (flushed) to disk, but rather the processing results of those contents (as represented in the dirty buffer cache blocks) are flushed to disk. That is, only the dirty buffer cache blocks (and not the file system operation record) are written to disk. However, once the changes to be made to the file system are essentially reflected in the file system operation record and stored in the NVLOG, processing of the request is considered complete and the file system notifies the protocol server of such completion. The protocol server thereafter generates a reply containing information indicating, e.g., a successful completion of the request, and returns the reply to the client 110. In addition, the protocol server stores the reply in the reply cache so that it can reply to any duplicate requests without consulting the file system.

In an illustrative embodiment, each client 110 creates a client connection (e.g., a TCP connection) with the protocol server (e.g., NFS server 212) executing on the storage system 120 to issue requests (e.g., NFS requests) of a logical stream to the server. In response to creating the connection or data flow associated with the client, the NFS server allocates a microcache to the data flow. The microcache is illustratively embodied as a "bin" having allocated entries or "buckets" into which are loaded replies associated with the requests of the stream issued by the client. The depth of the microcache illustratively comprises an estimated number of allocated entries that is managed using a predetermined policy, such as a least recently used (LRU) algorithm.

The NFS server 212 illustratively allocates each flow the same size microcache, e.g., 100 entries, wherein each entry has a size sufficient to accommodate a request of the stream. In response to reception of a new request, the oldest unused entry in the microcache is discarded and used to accommodate/satisfy the new request. If all entries of the microcache allocated by the server are currently in progress (i.e., all 100 requests are currently being processed by the file system and have not yet been updated with replies) and another request associated with the flow is received at the server, the NFS server 212 may discard ("leak") an entry from the cache, e.g., according to the LRU algorithm. However, such a situation may indicate that either the microcache is too small (the client is more active than estimated) or that there may be a problem (particularly if the server has replied to some of the requests) with, e.g., the network. Thus, by examining client activity on a per flow basis, the server can determine the behavior and needs of the client, e.g., whether the server is providing the necessary service/resources required by the client, which was absent in the prior art.

Figure 3:
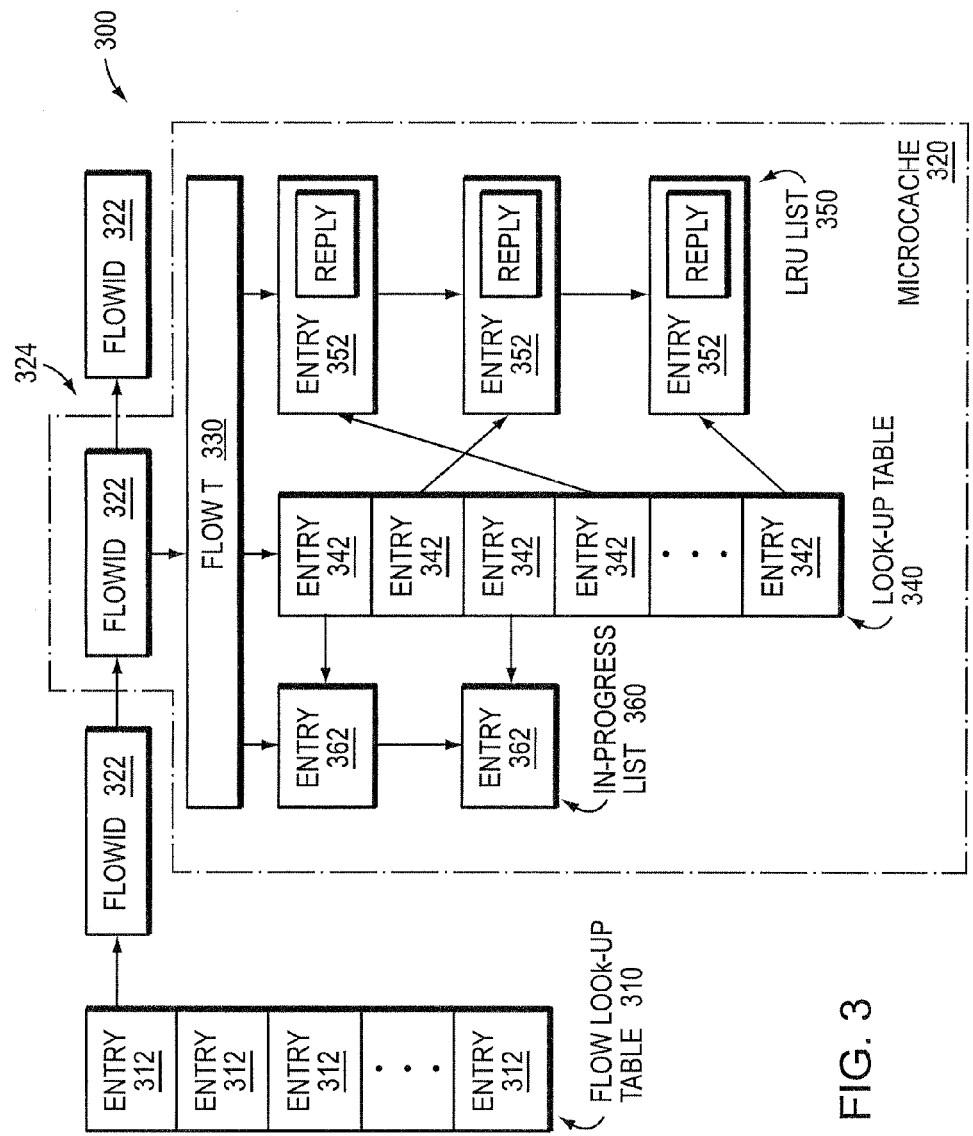
FIG. 3 is a schematic block diagram illustrating a flow based reply cache according to the present invention.

FIG. 3 is a schematic block diagram illustrating the flow based reply cache 300 according to the present invention. The NFS server 212 illustratively sorts and manages entries of the reply cache 300 by logical data flow; accordingly, each logical data flow is associated with its own portion of the reply cache (i.e., a microcache) maintained by the NFS server. To that end, the flow based reply cache includes a data structure, e.g., a flow look-up table 310, having a plurality of entries 312, each of which contains a reference (e.g., a logical data flow) to a microcache 320. The flow look-up table 310 is illustratively embodied as a hash table, wherein client connection information is hashed to a specific entry 312. As a result, the contents of the look-up table 310 function as indexes used by the NFS server 212 to reference (point to) logical data flows using the client connection information. Note that the information involved with the lookup operation may be cached so that it can be accessed efficiently and accurately, and so that the appropriate bin (microcache) can be identified quickly.

In an illustrative embodiment, each logical data flow is represented in memory 124 by a flow data structure comprising two parts: (i) an identifier structure or component (hereinafter "FlowID 322") used by the NFS server 212 to identify a particular logical data flow, and (ii) a main body component (hereinafter "FlowT 330" and its supporting data structures, as described herein) containing the actual reply cache information and statistics for the data flow. Each FlowID 322 is considered part of a FlowT 330 with which it is associated. As used herein, the terms "FlowID/FlowT pair" and "FlowT" may be used interchangeably. The FlowID/FlowT pair may continue to exist well beyond a connection (associated with the logical data flow) being closed by the client, e.g., the pairing may exist for the life of the NFS server 212.

Specifically, the FlowID is the structure pointed to (referenced) by the hashed entry 312 of the flow look-up table 310. The client connection information is stored in the FlowID 322 and illustratively includes (i) the client IP address, (ii) client port number, (iii) transport protocol and (iv) server IP address. Each microcache 320 of the reply cache 300 is thus identifiable using information stored in an associated FlowID 322. The FlowID 322 also contains all of the information needed for the NFS server to locate associated reply cache information in memory 124.

Once an entry 312 of the look-up table 310 is hashed, the server 212 searches through a hash chain 324 (linked list) of FlowIDs 322 referenced by that hashed entry for a matching logical data flow. Upon matching on a FlowID, the NFS server may access the actual data structures of the FlowT 330, e.g, in a 2-dimensional array fashion. At the core of each FlowT 330 is a microcache look-up table 340 used to either locate free, available entries 352 for the microcache within a LRU list 350 or identify in progress entries 362 within an in-progress request list 360 allocated to each data flow. Note that the architecture of the flow based reply cache 300 provides two look-up (hash) tables because there are two levels of indirection and cache look-up operations. The first flow look-up table 310 is used to find the proper logical data flow or microcache 320, and the second microcache look-up table 340 is used to find an available entry 352 in the microcache.

Illustratively, the NFS server 212 uses different portions of information to perform the reply cache look-up operations. A first portion (e.g., TCP and IP layer information) pertains to the client connection and is used to perform a flow look-up operation to the flow look-up table 310. Thereafter, a second portion (e.g., RPC layer information) is used to discern duplicate requests, i.e., RPC information matching is used to determine if there is an entry in the reply cache (a duplicate request). The RPC information illustratively includes (i) a transaction identifier (XID) of the request, (ii) a version number of the RPC program (PROGNUM) executed on the storage system, and (iii) an RPC procedure number (PROC) of the action to be taken by the program.

For example, the microcache look-up table 340 contains entries 342 (e.g., indexes) that point to each reply cache entry, illustratively indexed using a hash based on the XID and matching based on XID, PROC, PROGNUM and a checksum. (Note that if the XID matches to a unique entry, the comparison stops. But if such matching does not allow identification to a unique entry, then matching based on the additional RPC information is needed.) The XID is chosen by the client to collate requests and replies. The XID is illustratively embodied as a value that increments with each client request and is seeded in a pseudo-random manner at boot time. The XID may be initialized to a predetermined value by the client; however, the XID is illustratively initialized as a pseudo-random number each time the client boots.

In an illustrative embodiment, each microcache 320 has a fixed number of reply cache entries specified by a system-defined constant, e.g., 100 entries as initially allocated to each newly created flow. When residing in the cache, a reply cache entry is on one of two lists, the LRU list 350 or the in-progress list 360. An entry on the in-progress list 360 denotes that a request has been received and is currently being processed by the file system 240, i.e., the NFS server 212 is waiting for the reply data to be loaded into the entry. Illustratively, the entry is marked as being in existence (assigned to a request) but not having a result of the processing and, thus, no reply has been sent to the client.

The LRU list 350 is illustratively an "age ordered" list (e.g., a doubly-linked list) that has a number of possible links (one to a next LRU entry that is younger, another to a previous LRU entry that is older and another to the end or tail of the LRU list, e.g., if the entry is the oldest). The LRU list is a property of the data flow, i.e., the flow maintains information about the head and tail of its LRU list. If a new entry is needed for a new request of the flow, the LRU list is consulted to find the oldest entry on the list and that entry is assigned to the request. The LRU list is provided on a per flow (per bin) basis, i.e., one LRU list per flow.

As noted, each entry 342 of the microcache look-up table 340 is an index that points to a reply cache entry; however, that entry may assume different states. For example, a reply cache entry may be assigned a request that has been processed by the file system 240 and updated with reply data. Accordingly, the entry holds valid reply data within the reply cache and thus assumes a valid state as represented by entry 352 of the microcache LRU list 350. (Note that, depending on the amount of time it has been residing in the cache, the entry 352 may thereafter assume an available state.) In contrast, the reply cache entry may be in an in-progress state and thus represented by an entry 362 of in-progress list 360. When a new cacheable request arrives from a client 110, the NFS server 212 removes a cache entry 352 associated with that client connection from the end of the LRU list 350, updates that entry with information pertaining to the request and inserts that entry on the in-progress list 360.

In an illustrative embodiment, the server maintains a "high watermark" of in-progress entries 362 in each microcache 320 to thereby provide an indication of the depth of that client's microcache. The high watermark is illustratively less than the full estimated depth (e.g., one third) and provides an indication to the server 212 of the number of outstanding requests from that client 110. For example, if the high watermark reaches a certain number of in-progress entries and does not increase from that mark, then the server has a sufficient indication that this may be the maximum number of requests that the client will have outstanding at one time. In addition, if the server 212 has received a request and has not sent a reply, the server knows that the request is outstanding. If the client has more outstanding requests than entries allocated in its microcache, then the server may allocate additional entries for the microcache 320. Illustratively, the server may grow (increase) the microcache by a predetermined amount, e.g, one third.

When the request is completed, the entry is transferred from the in-progress list 360 to the beginning or head of the LRU list 350 (because it is the most recently used) and the server 212 populates the entry's associated protocol reply structure with any information needed to formulate a response or reply to the original NFS request. In other words, once the file system has finished processing the request, the NFS server returns a reply to the client 110. The reply cache entry then transitions from the in-progress state to a valid state, the reply data is loaded into the entry and the entry is inserted onto the LRU list 350.

Operation of Flow Based Reply Cache

Figure 4A:
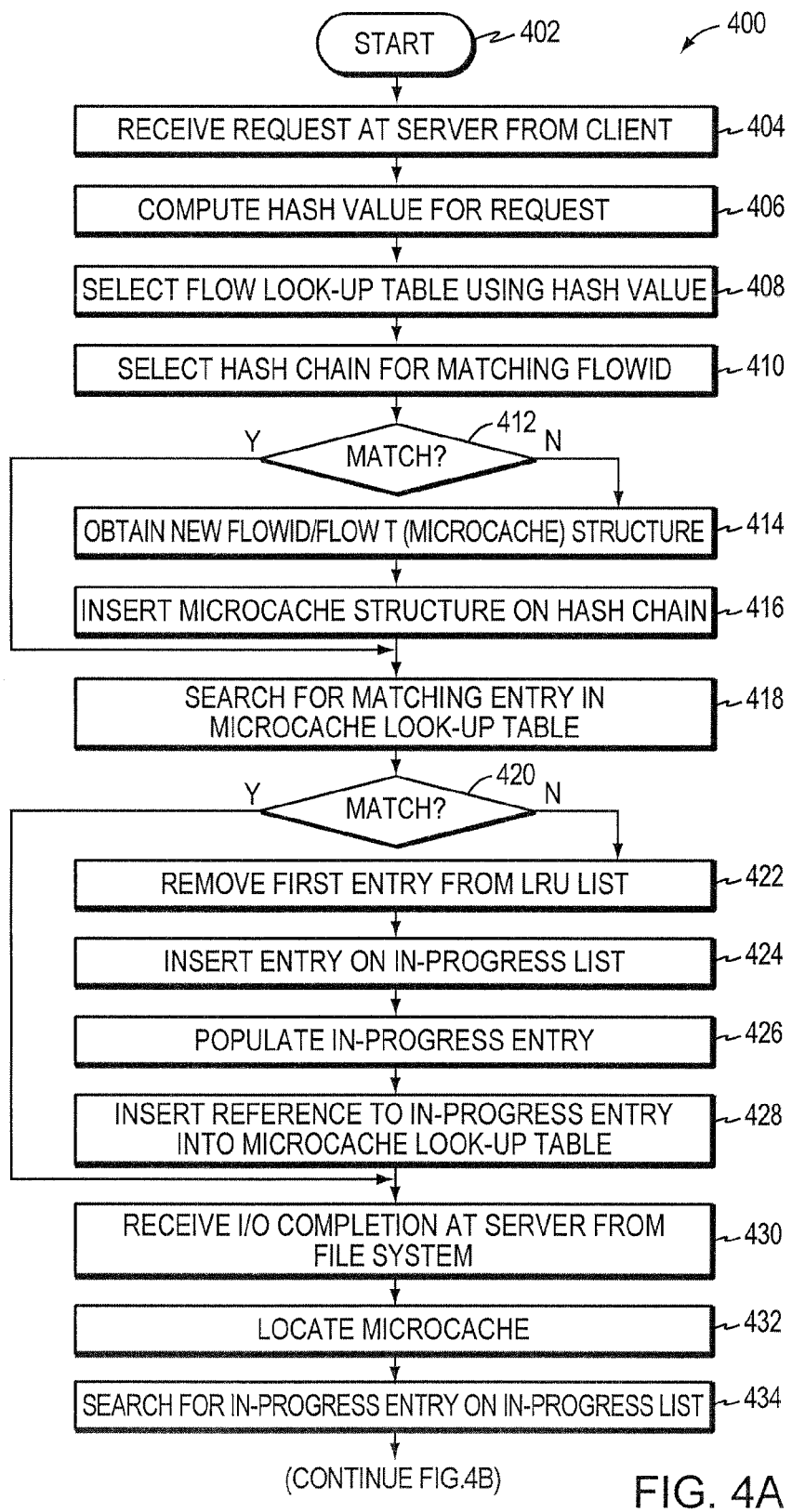
FIGS. 4A and 4B are flowcharts illustrating an operational procedure for the flow based reply cache according to the present invention.
Figure 4B:
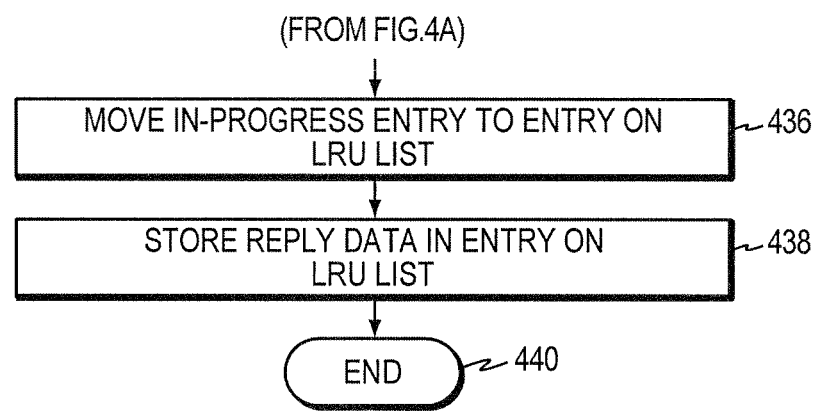

FIGS. 4A and 4B are flowcharts illustrating an operational procedure for the flow based reply cache according to the present invention. In particular, the procedure is directed to a cache insertion operation using the flow based reply cache architecture and structures described herein. The procedure 400 starts at Step 402 and proceeds to Step 404 where the protocol server (e.g., NFS server 212) receives a new, non-idempotent request (e.g., a NFSv3 request) from a client which does not yet have any entries in the reply cache 300. In Step 406 the NFS server computes a hash value for the request, e.g., based on the client's connection information, and in Step 408, selects an appropriate flow look-up table 310 using the hash value computed from a conventional hash function. As noted, the hash value for the client connection is illustratively based on the client's IP address and port number, as well as transport protocol (TCP or UDP) used and the server's IP address.

In Step 410, the server searches the hash chain 324 for a FlowID 322 that matches the client's connection information. Here, the hash value may be matched to an entry 312 of the table 310 and the matching entry point to (reference) the hash chain 324 of FlowIDs 322. If there is no match in Step 412, e.g., there is no reference to a FlowID/FlowT pair for the client in the flow look-up table 310, the NFS server obtains a new FlowID/FlowT pair structure (i.e., microcache 320) from, e.g., a free list (not shown) in Step 414 and, in Step 416, inserts the structure into the FlowID hash chain 324. Note that if memory structures of the free list are needed, the server may issue a memory allocation (malloc) request to a memory manager of the storage system. Note also that entries (structures) 352 removed from the LRU list 350 are loaded into the free list, thereby effectively placing them back in an available pool.

Otherwise, in Step 418, the NFS server searches for a matching entry in the microcache look-up table 340 of the microcache 320 of the reply cache 300. That is once a microcache (or bin) has been located, the server performs a look-up operation for the request (or bucket) in the microcache look-up table 340. If there is a match in Step 420, i.e., the new request is a retransmission of a previous operation request, a reply for that previous request may be in the reply cache and the procedure jumps to Step 430. Otherwise, the microcache is empty and therefore the server does not find a match. Accordingly, in Step 422, the server 212 removes the first cache entry 352 from the LRU list 350 and, in Step 424, inserts that entry as entry 362 on the in-progress list 360. Note that the server 212 moves the entry to the LRU list only when the request has been completed and the reply sent back to the client. Note also that if all of the entry structures on the LRU list 350 are populated, the server 212 retrieves the least recently used entry from the list.

In Step 426, the NFS server populates the cache entry 362 with, e.g., information from the RPC request and, in Step 428, inserts a reference (entry 342) to the populated entry into the microcache look-up table 340. Specifically, the cache entry is populated and inserted onto the microcache look-up table, so that the entry 342 can be indexed based on the hash of the XID (unique label of the bucket). Note that the cache entry 342 is not inserted onto the look-up table 340 in any particular order. Illustratively, the microcache look-up entry 342 remains valid until the reply cache entry 360 is removed from the LRU list 360 and recycled for a new request.

In Step 430, the NFS server receives an I/O completion from the file system and, in Step 432, the NFS server 212 locates the logical data flow (microcache) relating to the operation request, e.g., in the flow look-up table 310. Here, the file system 240 has finished processing the request and generated a reply to the request. The reply cache entry 362 remains on the in-progress list 360 until the file system returns the I/O reply message indicating that (processing of) the request is complete. When receiving such a message, the NFS server associates the request with the connection on which the request originated. The server 212 then uses the client connection information stored in the I/O message to locate the logical data flow corresponding to that connection. In particular, the message is received from the file system (instead of the network) and the two-step look-up operation previously described is performed to find the FlowID, FlowT and the entry.

In Step 434, the NFS server searches for the in-progress entry 362 using, e.g., the XID hash. Illustratively, a cacheable request should always be on the in-progress list 360 when the I/O reply message arrives from the file system 240. Upon locating the entry 362, the server 212 moves the entry from the in-progress list 360 to the LRU list 350 in Step 436. Note that the request's corresponding entry 342 in the microcache look-up table 340 remains unchanged. In Step 438, the NFS server stores reply (and protocol) data in the cache entry (now represented as entry 352) and the procedure ends at Step 440. At this point, the completed NFS request is considered entered into the microcache 320 of the reply cache 300. Reply data is loaded into the cache entry 352 so that the server can reply to any duplicate requests without consulting the file system.

Advantageously, the flow based reply cache obviates potentially harmful duplication of processing by the storage system, while also addressing many issues associated with the use of a global LRU design. By separating reply cache data based on client connection information, issues related to entry starvation for retransmitting clients can be avoided. Moreover, by organizing reply cache entries based on logical data flows, each microcache can be managed independently, and cache entry expiration becomes a factor of client request rate, rather than overall system request rate.

While there have been shown and described illustrative embodiments for a flow based reply cache, it is to be understood that various other adaptations and modifications may be made within the spirit and scope of the present invention. For example, in response to receiving a message from the file system 240 that it has finished processing a request and generated a reply to the request, the protocol server (e.g., NFS server 212) may maintain a pointer to the appropriate entry 362 on the in-progress list 360 in order to locate the logical data flow corresponding to client connection information contained in the message. That is, in an alternative embodiment of the invention, a performance optimization may be realized by the server 212 maintaining a pointer rather than performing the two-step look-up operation described herein to find the FlowID, FlowT and the entry.

The foregoing description has been directed to specific embodiments of this invention. It will be apparent, however, that other variations and modifications may be made to the described embodiments, with the attainment of some or all of their advantages. For instance, it is expressly contemplated that the components and/or structures described herein can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for providing a reply cache of a storage system, comprising:
   organizing the reply cache into one or more microcaches, each microcache having one or more reply cache entries;
   allocating a microcache of the one or more microcaches to a client of the storage system, wherein the client has its own pool of reply cache entries;
   in response to a non-idempotent request from the client, replying to the non-idempotent request using an entry in the pool of reply cache entries, wherein the non-idempotent request is prevented from executing on the storage system, wherein the pool of reply cache entries includes an in-progress list and a least recently used (LRU) list, wherein a completed entry on the in-progress list is transferred to the LRU list, wherein the entry is complete when it is processed by the storage system; and
   increasing a size of the microcache allocated to the client when a number of entries on the in-progress list exceeds a threshold.

2. The method of claim 1 wherein allocating the microcache to the client comprises identifying the client by a logical data flow.

3. The method of claim 2 wherein the logical data flow comprises a connection identifier identifying the client and a connection identifier identifying the storage system.

4. The method of claim 2 further comprising:
   matching the client request to a logical data flow identifier, wherein the logical data flow identifier has a client connection identifier.

5. The method of claim 1 further comprising:
   loading a reply associated with a previous client request into an entry of the client microcache.

6. The method of claim 4 further comprising:
   matching the client request against the pool of reply cache entries in the microcache.

7. The method of claim 1 wherein the client request is via a protocol selected from a group of protocols consisting of CIFS, NFS, iSCSI, and SCSI over Fibre Channel.

8. The method of claim 1, wherein the client request is identified using a transaction identifier.

9. The method of claim 1 further comprising:
   increasing the size of the client microcache.

10. The method of claim 4 wherein matching the client request to a logical data flow identifier comprising:
    performing a hash of the client request.

11. The method of claim 8, further comprising:
    computing a hash of the transaction identifier of the client request.

12. The method of claim 8, wherein the transaction identifier is a data structure including one or more integers.

13. A system configured to provide a reply cache of a storage system, comprising:
    a protocol server configured to execute on the storage system,
        the protocol server configured to maintain one or more microcaches of the reply cache, each microcache comprising one or more reply cache entries,
        the protocol server further configured to allocate each microcache to a client of the storage system, wherein each client has its own pool of reply cache entries,
        the protocol server further configured to respond to a non-idempotent request from a client using an entry in the pool of reply cache entries, wherein the protocol server prevents the non-idempotent request from executing on the storage system, wherein the pool of reply cache entries includes an in-progress list and a least recently used (LRU) list, wherein a completed entry on the in-progress list is transferred to the LRU list, wherein the entry is complete when it is processed by the storage system, and
        the protocol server further configured to increase a size of the microcache allocated to the client when a number of entries on the in-progress list exceeds a threshold.

14. The system of claim 13 wherein the protocol server comprises a protocol server selected from a group of protocol servers consisting of CIFS server, NFS server, iSCSI server, and SCSI over Fibre Channel server.

15. The system of claim 13 further comprising a flow look-up table having one of more entries, wherein each entry includes a reference to a first microcache of the one or more microcaches.

16. The system of claim 15 wherein the reference comprises a logical data flow allocated to the first microcache.

17. The system of claim 16 wherein the logical data flow is represented by a flow data structure comprising (i) an identifier component identifying the logical data flow, and (ii) a main body component having reply cache information for the logical data flow.

18. The system of claim 17 wherein the main body component comprises a microcache look-up table having the LRU list, and the in-progress list, wherein the in-progress list identifies in-progress entries allocated to the logical data flow, and wherein the LRU list identifies complete entries allocated to the logical data flow.

19. The system of claim 13 wherein the LRU list comprises an age ordered list.

20. The system of claim 18 wherein an in-progress entry on the in-progress list denotes that a request has been received from the client and is being processed by a file system executing on the storage system.

21. The system of claim 20 wherein the protocol server is further configured to mark the in-progress entry as being assigned to the request, but that no reply has been sent to the client.

22. The system of claim 13, wherein the protocol server is further configured to:
    identify the client request using a transaction identifier.

23. The system of claim 13, wherein the protocol server is further configured to:
    increase the size of the client microcache.

24. The system of claim 22, wherein the transaction identifier is a data structure including one or more integers.

25. A computer readable medium containing executable program instructions for providing a flow based reply cache of a storage system, the executable instructions comprising one or more program instructions for:
    organizing the flow based reply cache into one or more microcaches, each microcache comprising a plurality of reply cache entries;
    allocating each microcache to a client of the storage system, wherein the client has its own pool of reply cache entries;
    in response to a non-idempotent request from the client, replying to the non-idempotent request using an entry in the pool of reply cache entries, wherein the non-idempotent request is prevented from executing on the storage system, wherein the pool of reply cache entries includes an in-progress list and a least recently used (LRU) list, wherein a completed entry on the in-progress list is transferred to the LRU list, wherein the entry is complete when it is processed by the storage system; and increasing a size of the microcache allocated to the client when a number of entries on the in-progress list exceeds a threshold.

26. The computer readable medium of claim 25 wherein the program instruction for allocating each microcache to the client comprises one or more program instructions for identifying each client by a logical data flow.

27. The computer readable medium of claim 26 further comprising one or more program instructions for:
   using at least one microcache of the one or more microcaches to identify a stream of client requests associated with the logical data flow; and
   using the at least one microcache to isolate the client stream from other client streams and associated logical data flows used to deliver other requests served by the storage system.

28. The computer readable medium of claim 27 further comprising one or more program instructions for:
   loading replies associated with the client requests into the entries of the at least one microcache.

\* \* \* \* \*